United States Patent Office 3,053,769
Patented Sept. 11, 1962

3,053,769
THICKENING OF GREASES WITH ORGANO PHOSPHORUS COMPOUNDS
Stephen J. Zajac, Whiting, Ind., assignor to Standard Oil Company, Chicago, Ill., a corporation of Indiana
No Drawing. Filed Mar. 13, 1959, Ser. No. 799,097
6 Claims. (Cl. 252—49.9)

This invention relates to a new additive agent for thickening lubricants and to mechanically stable greases suitable for use at moderate operating temperatures and greases containing said additive agent.

In recent years there have been developed many thickened greases for use under special high temperature operating conditions. However, the major applications of greases still fall within moderate operating temperatures and efforts must, therefore, still be made to improve such moderate operating temperature greases. A major consideration in such efforts is the mechanical stability of such greases. Although greases of good mechanical stability have been developed, often their cost of preparation detracts greatly from any economically efficient production.

I have found a new additive agent easily prepared from relatively inexpensive starting materials, which additive agent may be added to normally liquid lubricants as a thickening agent to form a grease composition of good mechanical stability and suitable for use at moderate operating temperatures.

The additive agent of this invention may be represented by the following structural formula:

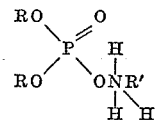

wherein R represents an alkyl radical having from about 8 to about 18 carbon atoms and preferably about 12 carbon atoms and R' represents an abietyl radical selected from the group consisting of a dehydroabietyl radical, a dihydroabietyl radical, and a tetrahydroabietyl radical. The R and R' radicals can contain substituents such as, for example alkyl, alkoxy, cyano, aryl, hydroxy, carboxy, halogen, nitro and other substituent groups.

The general structural formulae of the abietyl radicals are:

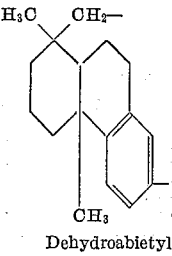
Dehydroabietyl

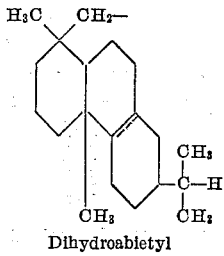
Dihydroabietyl

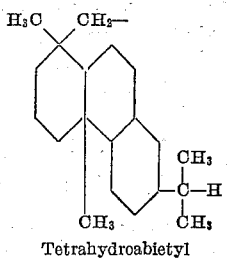
Tetrahydroabietyl

The additive agent of this invention may be prepared by the reaction of a primary hydroabietylamine with a dialkyl phosphate having from 10 to 18 carbon atoms.

Accordingly, the hydroabietyl amine and dialkyl phosphate are admixed in the presence of a solvent or diluent and reacted at a temperature of from about 70° F. to about 315° F. and preferably from about 250° F. to about 280° F. The reaction apparently proceeds as represented by the following structural diagram:

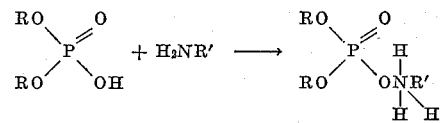

The reaction is very rapid. The resulting product as defined by the above structural formula is useful as a grease thickener in that it imparts mechanical stability to the resulting grease under moderate operating conditions.

In the above preparation, it may be seen by the reaction diagram that theoretically approximately equimolar amounts of dialkylphosphate and hydroabietyl amine are reacted to form the addition agents of this invention. However, in practice, it is intended that from about 0.3 to about 1.5 moles of dialkylphosphate be reacted per mole of hydroabietyl amine and it is preferred that from about 0.3 to about 0.4 mole of dialkylphosphate be reacted per mole of hydroabietyl amine.

The solvents or diluents present during the reaction permit ease of handling of the reactants and products. The solvents useable are those solvents which dissolve both reactants, i.e. both the hydroabietyl amine and the dialkyl phosphate. Such solvents include alcohols, ethers, naphthas, chlorinated hydrocarbon solvents, esters, etc., and the oleaginous lubricant vehicles set out below. When a solvent or diluent other than an oleaginous lubricant vehicle is selected, it should be sufficiently volatile so that it may be removed easily to leave an addition agent product. However, it is preferred to use an oleaginous lubricant vehicle as the solvent or diluent and thereby produce a finished thickened grease or grease concentrate without the necessity of removing a solvent or diluent and blending the addition agent into an oleaginous lubricant vehicle.

When the above reaction is carried out in a removable solvent, the product is separated from the solvent as a grease thickening agent. The grease thickening agent may be incorporated into oleaginous lubricant vehicles in amounts of from about 2 to about 25 weight percent and preferably from about 7 to about 20 weight percent to form a thickened grease.

When the reaction is carried out in the presence of an oleaginous lubricant vehicle in lieu of the removable solvent, sufficient amounts of oleaginous lubricant vehicle may be used to produce a thickened grease composition containing the reaction product in amounts falling within the above weight percents. Alternatively, less oleaginous lubricant vehicle may be used to form an addition agent concentrate containing from about 25 to about 100 weight percent of the reaction product. The concentrate is very useful for storage purposes and preparation in concentrate form allows preparation of more thickening agent per reaction column. The concentrate may be diluted with additional oleaginous lubricant vehicle before use to form a finished grease having the amounts of thickening agent set out above.

Examples of hydroabietyl amines which can be used in the preparation of the above described addition agents are dehydroabietyl amine, dihydroabietyl amine and tetrahydroabietyl amine or mixtures of such amines. A particularly well suited amine is a product marketed by Hercules Powder Company as "Rosin Amine D." This product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of hydroabietyl amines in the following approximate proportion:

| | Rosin amine D, percent |
|---|---|
| Dehydroabietyl amine | 60 |
| Dihydroabietyl amine | 30 |
| Tetrahydroabietyl amine | 10 |

The suitable dialkyl phosphates which may be used to prepare the grease thickening agents and thickened greases disclosed herein are those dialkyl phosphates wherein the alkyl groups have from 8 to 18 carbon atoms and which may contain other substituents as indicated with regard to the R groups of the addition agent structural formula hereinbefore set out. However, more advantageously, the alkyl groups of the dialkyl phosphate should be a saturated hydrocarbon group. The following are examples of such dialkyl phosphates: dioctyl phosphate, didecyl phosphate, di(5-ethyl-2-nonyl) phosphate, dilauryl phosphate, dimyristyl phosphate, di(7-ethyl-2-methyl-4-undecyl) phosphate, dicetyl phosphate, dioctadecyl phosphate, lauryl octadecyl phosphate, and decyl cetyl phosphate. The particularly preferred dialkyl phosphate is dilauryl phosphate. Dilauryl phosphate may be obtained commercially in admixture with higher and lower dialkyl phosphates wherein dilauryl phosphate predominates. One such commercial product is "Ortholeum 162," produced by Du Pont de Nemours Company. "Ortholeum 162" is a mixture of long chain dialkyl phosphates predominating in dilauryl phosphate and is especially useful in preparing reaction products with the hydroabietyl amines because of its commercial availability.

Oleaginous lubricant vehicles which can be thickened with the herein described thickening compounds to form greases of the present invention can be silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" (made by Hooker Chemical Company), the trifluorochloroethylene polymers, and other lubricant vehicles.

The silicone polymer oils which may be employed in accordance with the present invention are those falling substantially within the lubricating oil viscosity range. Advantageously used among such oils are dimethyl silicone polymer, chlorophenylmethyl silicone polymer, phenylmethyl silicone polymer, etc. A particularly desirable phenylmethyl silicone polymer for use in accordance with the present invention is Dow-Corning 550 Silicone Fluid, a product of Dow-Corning, Inc. Another suitable silicone polymer is a chlorophenylmethyl silicone marketed as GE 81406 by General Electric Company.

Other oleaginous vehicles which may be employed herewith are, for example, mineral oils in the lubricating oil viscosity range, i.e. from about 50 S.S.U. at 100° F. to about 300 S.S.U. at 210° F. These mineral oils may be suitably solvent extracted, with phenol, furfural, B,B'-dichlorodiethylether (Chlorex), liquid $SO_2$, nitrobenzene, etc. Synthetic lubricating oils resulting from polymerization of unsaturated hydrocarbons or other oleaginous materials within the lubricating oil viscosity range such as high molecular weight polyoxyalkylene compounds such as polyalkylene glycols and esters thereof, aliphatic diesters of dicarboxylic acids such as the butyl, hexyl, 2-ethylhexyl, decyl, lauryl, etc. esters of sebacic acid, adipic acid, azelaic acid, etc., may be thickened by the addition agent of the present invention to produce excellent greases. Polyfluoro derivatives of organic compounds, particularly hydrocarbons, and dibasic acid esters of $H(CF_2)_nOH_2OH$, in the lubricating oil viscosity range can be thickened with compounds of the present invention. Other synthetic oils, such as esters of aliphatic carboxylic acids and polyhydric alcohol, e.g. trimethylolpropane pelargonate, pentaerythritol hexanoate, can be used as suitable oil vehicles.

The following examples illustrate the preparation of thickened greases in accordance with this invention.

EXAMPLE I 8.0 g. (8% of total reaction mixture) of "Rosin Amine D" were admixed with 88.0 g. (88% of total reaction mixture) of solvent extracted 40 weight mineral lubricating oil and heated to about 250° F. 4.0 g. (4% of total reaction mixture) of "Ortholeum 162" were added and heating at about 250° F. was continued for about 15 minutes. The resulting product was cooled and milled to form a thickened grease composition.

EXAMPLE II 8.0 g. (8% of total reaction mixture) of "Rosin Amine D" were admixed with 88.0 g. (88% of total reaction mixture) of Dow-Corning 550 Silicone Fluid and heated to about 250° F. 4.0 g. (4% of total reaction mixture) of "Ortholeum 162" were added and heating at about 250° F. was continued for about 15 minutes. The resulting product was cooled and milled to form a thickened grease composition.

EXAMPLE III 8.0 g. (8% of total reaction mixture) of "Rosin Amine D" were admixed with 88.0 g. (88% of total reaction mixture) of trimethylol propyl pelargonate and heated to about 250° F. 4.0 g. (4% of total reaction mixture) of "Ortholeum 162" were added and heating at about 250° F. was continued for about 15 minutes. The resulting product was cooled and milled to form a thickened grease composition.

EXAMPLE IV 10.0 g. (10% of total reaction mixture) of "Rosin Amine D" were admixed with 85.0 g. (85% of total reaction mixture) of solvent extracted 40 weight mineral lubricating oil and heated to about 250° F. 5.0 g. (5% of total reaction mixture) of "Ortholeum 162" were added and heating at about 250° F. was continued for about 15 minutes. The resulting product was cooled and milled to form a thickened grease composition.

The unworked and worked penetration values for the above examples were determined by ASTM Method 217–52T and the drop points of the examples were determined by ASTM Method D566–42. The data from the two ASTM tests are reported in the table, below:

Table

| Example | Unworked Penetration [1] | Worked Penetration [1] | Drop Points, ° F. |
|---|---|---|---|
| 1 | 307 | 307 | 302 |
| 2 | 302 | 302 | 305 |
| 3 | 302 | 302 | 305 |
| 4 | 283 | 282 | 303 |

[1] Penetrations determined on a ¼ size cone and converted.

The only slight variations between unworked and worked penetration in the above tests demonstrate the consistency of mechanical stability exhibited by the hereinabove described greases. The drop points obtained demonstrate the suitability of such greases for use at moderate operating temperatures.

All percentages recited hereinabove and in the appended claims are percentages by weight unless otherwise specified.

It is evident from the above that I have provided a new additive agent for thickening lubricants and new mechanically stable greases containing the new additive agent and suitable for use under moderate operating temperatures.

Therefore, I claim:

1. An organophosphorus compound having the general formula:

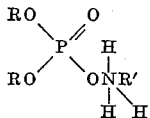

wherein R represents an alkyl radical having from 8 to 18 carbon atoms and R' is an abietyl radical selected from the group consisting of dehydroabietyl, dihydroabietyl, tetrahydroabietyl radicals and mixtures thereof.

2. An organophosphorus compound having the formula:

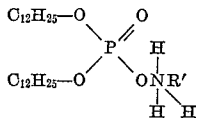

wherein R' represents an abietyl radical selected from the group consisting of a dehydroabietyl radical, a dihydroabietyl radical, a tetrahydroabietyl radical and mixtures thereof.

3. A normally liquid oleaginous lubricant vehicle containing an amount of the composition of claim 1 sufficient to thicken said vehicle to grease consistency.

4. A lubricating grease composition comprising a normally liquid oleaginous lubricant vehicle thickened with from about 2% to about 25%, by weight, of the composition of claim 1.

5. A lubricant grease thickener concentrate comprising a normally liquid oleaginous lubricant vehicle containing from about 25% to about 100% by total concentrate weight, of the composition of claim 1.

6. A mixture of organo phosphorus compounds having the general formula:

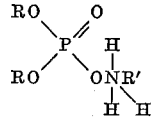

wherein R represents a saturated alkyl hydrocarbon radical having from 8 to 18 carbon atoms, R' is an abietyl radical selected from the group consisting of a dehydroabietyl radical, a dihydroabietyl radical, a tetrahydroabietyl radical and mixtures thereof, in which mixture of organo phosphorus compounds the predominating compound is of the above formula wherein both saturated alkyl hydrocarbon radicals contain 12 carbon atoms.

References Cited in the file of this patent

UNITED STATES PATENTS

| | | |
|---|---|---|
| 2,344,394 | Cook et al. | Mar. 14, 1944 |
| 2,368,599 | Reiff | Jan. 30, 1945 |
| 2,403,762 | Smith et al. | July 9, 1946 |
| 2,563,506 | Werntz | Aug. 7, 1951 |
| 2,583,549 | Daul et al. | Jan. 29, 1952 |
| 2,824,839 | Templeman | Feb. 25, 1958 |
| 2,832,740 | Garden et al. | Apr. 29, 1958 |